United States Patent [19]

Yelke

[11] 4,192,179

[45] Mar. 11, 1980

[54] PIEZOELECTRIC TRANSDUCER FOR FUEL INJECTION ENGINE

[76] Inventor: Edward Yelke, 945 S. Kensington, La Grange, Ill. 60525

[21] Appl. No.: 949,061

[22] Filed: Oct. 6, 1978

[51] Int. Cl.² ........................................... G01M 15/00
[52] U.S. Cl. ..................................... 73/119 A; 73/753
[58] Field of Search .................... 73/119 A, 753, 754, 73/DIG. 4, 658; 310/338

[56] References Cited

U.S. PATENT DOCUMENTS 3,898,885  8/1975  Russell ........................ 73/119 A X

FOREIGN PATENT DOCUMENTS 1389408  4/1975  United Kingdom ................ 73/119 A Primary Examiner—Jerry W. Myracle
Attorney, Agent, or Firm—Leo J. Aubel

[57] ABSTRACT

A system for sensing and monitoring the injection of fuel into a fuel injection type engine, such as a diesel engine, including a piezoelectric transducer comprising a piezoelectric collar mounted on the fuel line to sense the change in dimensions of the fuel line due to the surge of pressure created in the fuel line as the fuel is injected through the line into the engine.

3 Claims, 7 Drawing Figures

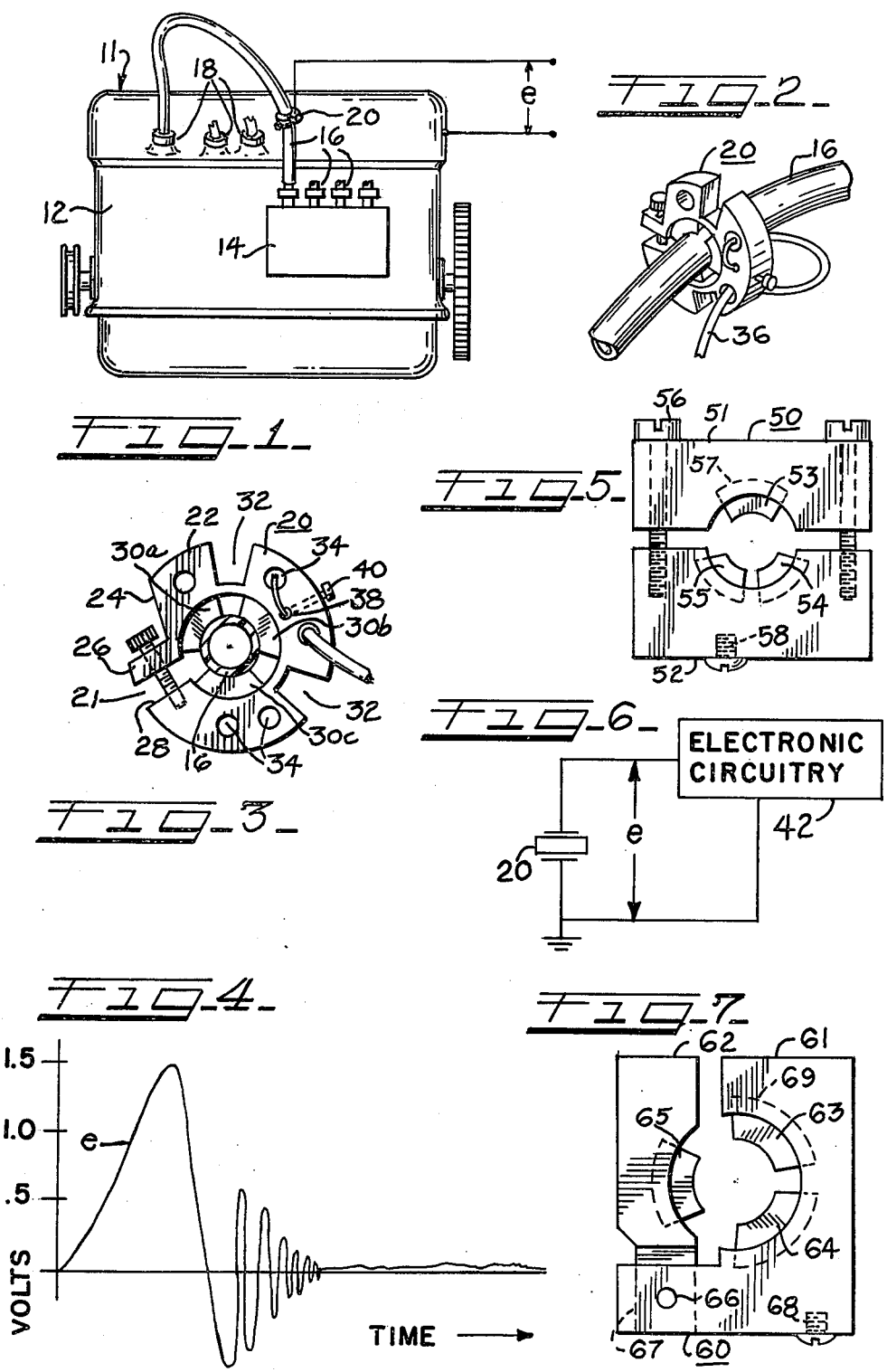

PIEZOELECTRIC TRANSDUCER FOR FUEL INJECTION ENGINE

BACKGROUND OF THE INVENTION AND STATEMENT OF THE PRIOR ART

The present invention relates generally to a system for aiding in the timing of a fuel injection engine; and more particularly, to such a system including a piezoelectric transducer mounted on the fuel line for an engine cylinder for monitoring and sensing the fuel injection into the engine. The inventive transducer may also be conveniently utilized to determine engine RPM.

A number of devices are known which provide a sensing mechanism for sensing the fuel applied through a fuel line to a fuel injection engine. One such basic system is shown in U.S. Pat. No. 3,327,526, wherein a sensing device is positioned around the fuel line and comprises a microswitch which is caused to open and close in response to the surge of fuel through the fuel line. Another device for sensing the fuel injection to an engine is disclosed in U.S. Pat. No. 3,511,088, wherein a piezoelectric transducer or alternatively, a pressure sensitive transistor, is positioned to be actuated to develop a signal in response to the pressure developed as fuel is injected through the fuel line into the engine cylinder.

For one reason or another, the prior art devices known to the applicant have not been successful in providing a commercially viable product of the type described. The prior art devices just do not function properly in their operating environment.

Accordingly, it is the principal object of the present invention to provide a new and improved device for monitoring and sensing the charge of a fuel applied to a fuel injection engine.

It is another object of the present invention to provide a fuel injection monitoring and sensing device which is reliable in operation and provides a satisfactory signal representative of the fuel being injected to the associated engine, and which signal may be detected over engine vibrations and spurious noise.

It is another object of the present invention to provide a fuel injection monitoring and sensing device which may be conveniently mounted on a fuel injection line either in original manufactured equipment (OEM) or as a retrofitted device.

SUMMARY OF THE INVENTION

The present invention is directed to a fuel injection monitoring and sensing device for mounting on a fuel injection line. The inventive device is essentially in the form of a split collar with a piezoelectric material positioned in circular configuration in the inside surface of the collar. When the collar is mounted on the fuel line, the piezoelectric crystal material is positioned adjacent to and against the exterior surface of the fuel line whereby any expansion of the fuel line due to fuel being forced therethrough is sensed by the piezoelectric material. As is known, the piezoelectric material converts this pressure into a voltage which may be coupled out to a suitable circuit.

DESCRIPTION OF THE DRAWINGS

FIG. 1 is a sketch of a side elevation of a diesel engine with the inventive pressure transducer shown mounted on a fuel injection line;

FIG. 2 is an isometric drawing substantially to scale of one embodiment of the applicant's pressure transducer mounted on a fuel injection line;

FIG. 3 is a plan view of the pressure transducer of FIG. 2;

FIG. 4 is a waveform showing the electrical signal output of the inventive pressure transducer;

FIG. 5 is a plan view of a second embodiment of the inventive transducer;

FIG. 6 is a sketch showing the pressure transducer connected to an electronic circuit; and, FIG. 7 is a plan view of a third embodiment of the inventive transducer.

DESCRIPTION OF THE PREFERRED EMBODIMENT OF THE INVENTION

Refer first to FIG. 1 which shows an internal combustion engine of the diesel type represented by the reference numeral 11 and comprising an engine block 12 having a plurality of cylinders. A fuel injection pump housing 14 on the engine block has a number of fuel injection lines 16 connecting through injection nozzles 18 to respective cylinders as is known in the art.

A pressure transducer 20 according to the invention is mounted on a fuel injection line 16. The fuel injection line 16 is formed of metallic tubing of sufficient strength to withstand the high injection pressures utilized in diesel engines. As is known, the tubing of line 16 will expand as the fuel under pressure passes through the line. As will be explained hereinbelow, the transducer 20 develops an electrical signal responsive to the fuel injection. Such signal may be used for engine timing purposes since there is a desired relation of the time of fuel injection into the cylinder with respect to the instantaneous position of the associated piston.

As noted above, various prior art systems have been proposed to sense the timing of the fuel injection to an engine; however, these prior art systems have been found to have limited usage, primarily, it is believed, because they are not entirely reliable and because engine vibration gives rise to unreliable readings.

Refer now to FIGS. 2 and 3 which show in clear detail the inventive pressure transducer. In FIG. 2, the inventive transducer 20 is shown in essentially actual size as mounted on an injection line 16. The transducer 20 is formed as a split collar 22 which can be opened as at 21 for mounting onto injection line 16. Collar 22 includes a peripherally recessed portion 24 which forms a flange 26 as one open edge of the collar. Flange 26 is threaded for receiving a machine screw 28 which tightens flange 26 against the opposing edge of surface 28 of the collar. A piezoelectric crystal material generally labeled 30 is adhered such as by gluing onto the inside surface of the collar 22.

In the embodiment shown, the piezoelectric material 30 is formed as three spaced contoured sections 30a, 30b, and 30c for accommodating to the inside surface collar 20 and to the outside surface of the fuel line 16. The multiple contacts of the piezoelectric material directly to the line 16 provided by the three sections 30a, 30b, and 30c tend to maximize the output signal while minimizing noise.

Additionally, note that in the preferred embodiment the outside diameter of the collar 22 is slit to form gaps 32 therein in spaced relation around its periphery, and apertures 34 are drilled through the planar surface of the collar. The purpose of the foregoing is to reduce the overall mass of the collar to enhance the signal developed by the piezoelectric material 30 and to minimize noise pickup due to engine vibrations.

An electrical conductor 36 is inserted through two of the apertures 34 and has its end inserted in a radially directed hole 38. A screw 40 electrically and mechanically affixes conductor 36 to collar 22 in hole 38.

As is known, a change in size of line 16, that is, the expansion of line 16 due to pressure induced stress occurs when fuel under pressure is injected therethrough causing a change in pressure applied to the piezoelectric material 30 which converts or transforms the pressure to an electrical potential or signal "e". The signal "e" is obtained by transducer 20 as is shown in FIG. 4 and comprises a waveform having a steeply rising leading edge and steeply falling trailing edge which then dampens to zero. The waveform rises to an amplitude of about 1.5 volts in the order of milliseconds dependent on the pressure developed by the fuel passing through the line. The steepness of the leading edge is dependent on the nozzle opening and the start of the fuel injection into the cylinder. The ringing effect of waveform "e" is caused by fluid reflections within the line. The amplitude of the ringing, or conversely the rate at which the waveform "e" is damped, varies greatly with engine speed and engine load characteristics. As indicated in FIG. 6 the signal "e" is coupled to electronic circuitry 42 of any suitable known design to be processed such as to provide timing, RPM, volume of fuel injected information and pollution control information.

FIG. 5 shows a second embodiment of the inventive transducer. As can be clearly seen from the drawing, the trnasducer 50 comprises two similar portions 51 and 52 each having a semi-circular center conforming to the diameter of the associated fuel line, not shown, and the portions 51 and 52 are affixed to one another around the fuel line by suitable screw 56. Contoured sections 53, 54 and 55 of piezoelectric material are positioned in respective recesses generally labeled 57 in portions 51 and 52 in a position to bear against the surface of the fuel line. The small screw 58 provides a means for connecting an electrical wire to the transducer 50.

FIG. 7 shows a third embodiment of the inventive transducer. The transducer 60 of FIG. 7 comprises a base 61 and an arm 62 which may be positioned and locked or clamped to in a suitable recess or groove 67 in base 61 as by a bolt or pin 66. The contoured sections 63, 64 and 65 of piezoelectric material are positioned in respective recesses generally labeled 69 in base 61 and arm 62 to bear against the surface of the associated fuel line, not shown. Screw 68 provides a means for connecting an electrical wire to the transducer 60.

The operation of the embodiments of the transducers 50 and 60 shown in FIGS. 5 and 7 respectively are essentially the same as that of the transducer 20 shown in FIGS. 2 and 3. It should be noted, that when the transducers 20, 50 and 60 are installed on a fuel line, the piezoelectric sections of each of the transducers will be in direct operating contact with the fuel line.

Note also that although three piezoelectric sections such as 30a, 30b, and 30c in transducer 20 have been found to provide an excellent output signal, it should be appreciated that more or fewer discrete sections of piezoelectric material may be used in the transducers shown.

While the invention has been particularly shown and described with reference to a preferred embodiment thereof, it will be understood by those skilled in the art that various changes in form and details may be made therein without departing from the spirit and scope of the invention.

I claim:

1. A pressure transducer for sensing the injection of fluid through a tubular line comprising in combination; a clamp formed essentially as a flexible collar of low mass for mounting around the line, discrete sections of piezoelectric material positioned on the inner surface of the collar; said piezoelectric material sections being contoured to bear against the line at areas around the circumference of said line, and said piezoelectric material sections each generating an electrical signal dependent on the pressure exerted on the line by the fluid passing through said line, and an electric connector connecting said piezoelectric material sections to associated electronic circuitry.

2. The transducer as in claim 1 wherein said piezoelectric material is formed as three separate sections positioned in spaced relationship around the circumference of said tubular line.

3. A transducer as in claim 1 wherein gaps are formed on the periphery of said collar, and apertures are drilled through said collar to reduce the mass thereof to enhance the signal output of the transducer material and to minimize the susceptibility of the collar to engine vibration.

* * * * *